United States Patent
Fritzler et al.

(10) Patent No.: US 7,291,840 B2
(45) Date of Patent: Nov. 6, 2007

(54) COMBINED TRANSMISSION/EMISSION TOMOGRAPHY APPARATUS

(75) Inventors: Sven Fritzler, Erlangen (DE); Björn Heismann, Erlangen (DE); Jörg Pfeiffer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 30 days.

(21) Appl. No.: 11/253,326

(22) Filed: Oct. 19, 2005

(65) Prior Publication Data

US 2006/0086905 A1 Apr. 27, 2006

(30) Foreign Application Priority Data

Oct. 19, 2004 (DE) ............ 10 2004 050 901

(51) Int. Cl.
*G01T 1/164* (2006.01)
(52) U.S. Cl. ............ 250/363.05; 250/363.03; 250/363.04
(58) Field of Classification Search ........ 250/363.05, 250/363.04, 363.03
See application file for complete search history.

(56) References Cited

U.S. PATENT DOCUMENTS 4,275,305 A * 6/1981 Racz et al. ............ 378/19
5,673,300 A * 9/1997 Reckwerdt et al. ........ 378/65
6,670,614 B1   12/2003 Plut et al.
6,810,103 B1 * 10/2004 Tybinkowski et al. ....... 378/20
6,956,925 B1 * 10/2005 Hoffman ..................... 378/4
2005/0061988 A1 * 3/2005 Tomura et al. ............ 250/394

FOREIGN PATENT DOCUMENTS

DE 203 04 631 U1 8/2003

* cited by examiner

*Primary Examiner*—Constantine Hannaher
(74) *Attorney, Agent, or Firm*—Schiff Hardin LLP

(57) ABSTRACT

A combined transmission/emission tomography apparatus for generation of tomographic slice images of an examination subject (preferably of a patient), has a supporting structure composed of a stationary stator and a rotor that rotates in operation, with at least one radiation-emitting device and at least one radiation-detecting device mounted on the rotor. The at least one radiation-emitting device and the at least one radiation-detecting device are primary components, and the apparatus has at least one associated supply component for one or more of the primary components. In the rotor all primary components are arranged in one rotation plane and all supply components are arranged outside of the rotation plane.

15 Claims, 4 Drawing Sheets

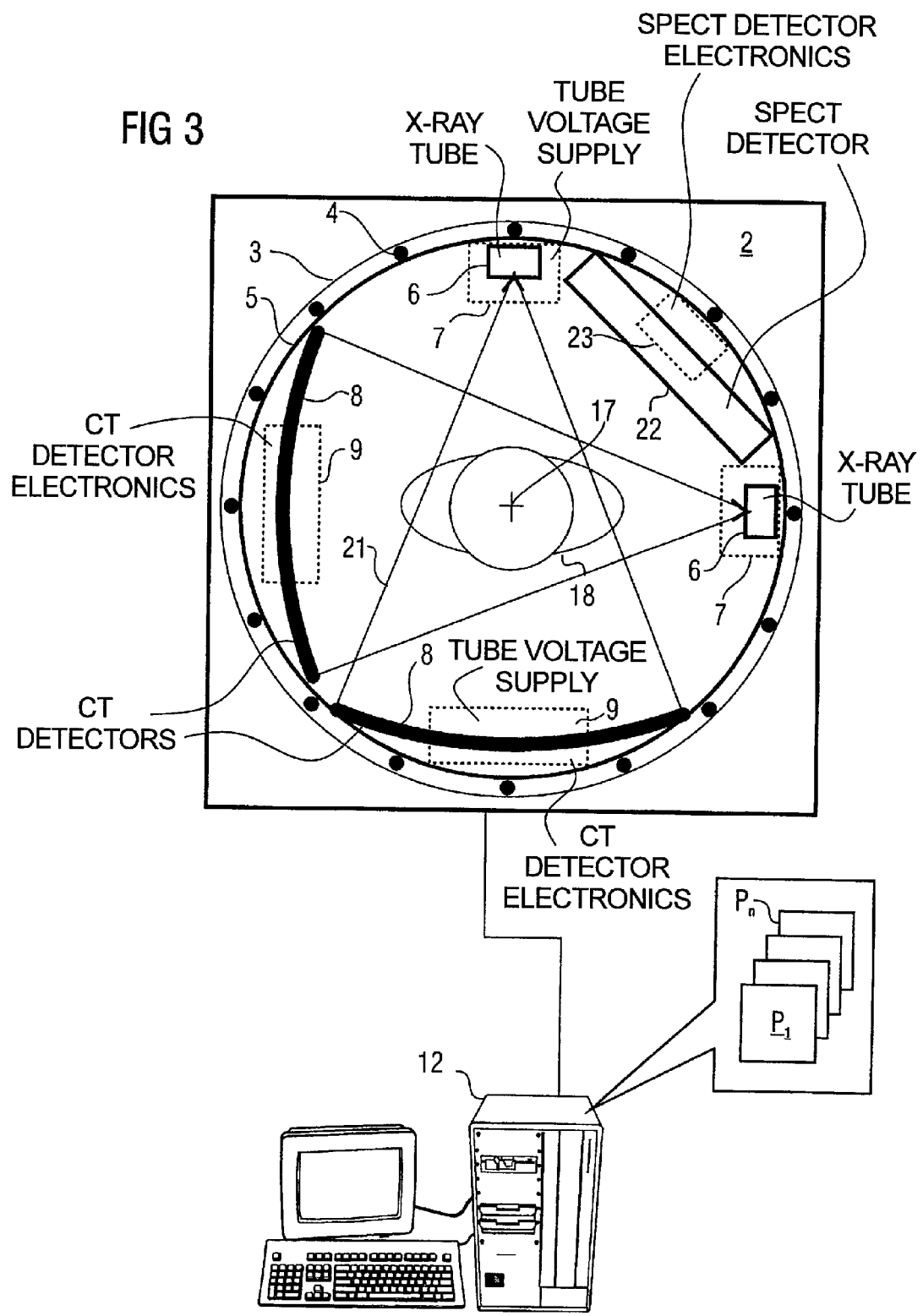

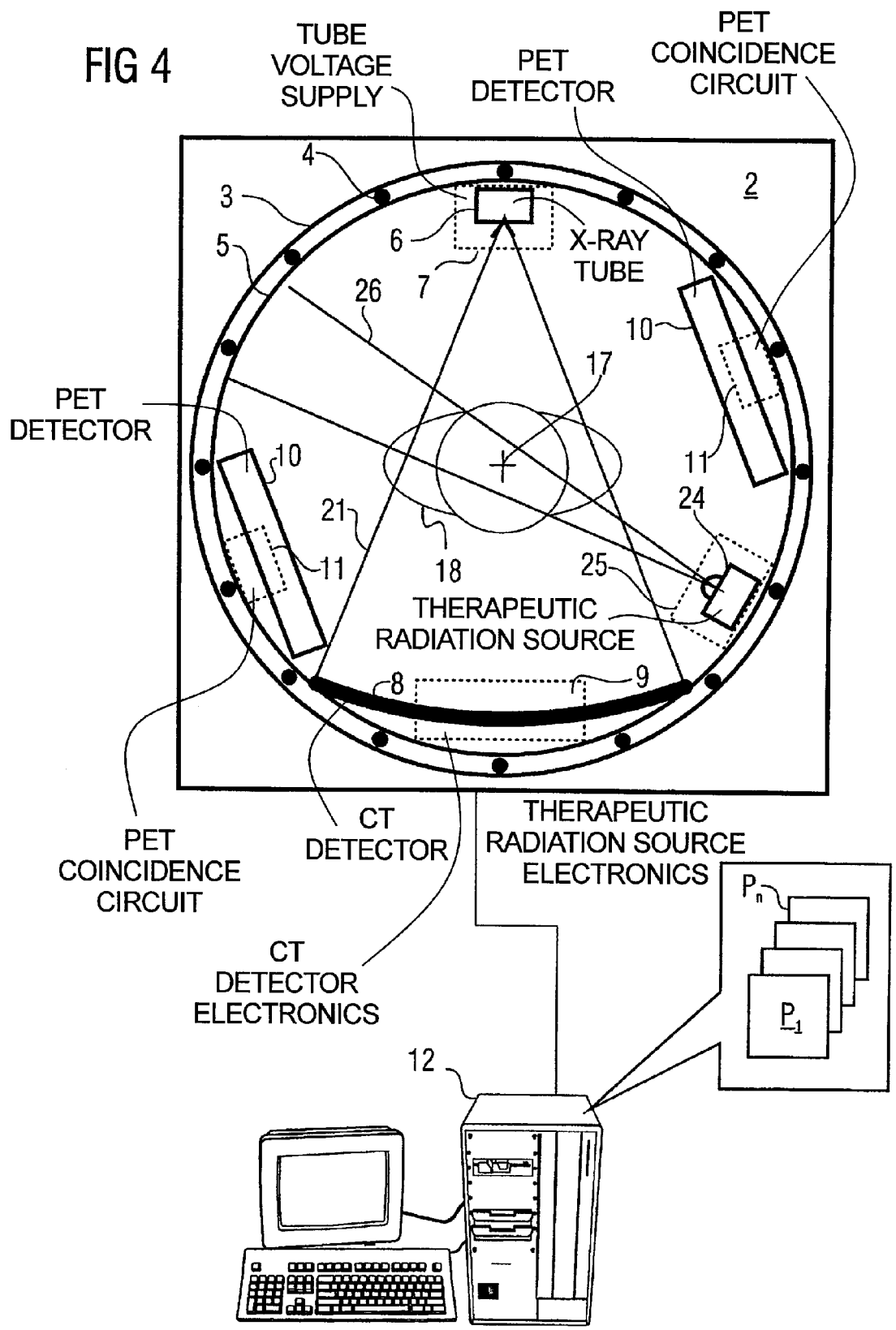

COMBINED TRANSMISSION/EMISSION TOMOGRAPHY APPARATUS

BACKGROUND OF THE INVENTION

1. Field of the Invention

The invention concerns a combined transmission/emission tomography apparatus for generation of tomographical slice images of an examination subject, preferably of a patient, of the type having a supporting structure having a stationary stator and a rotor borne in the stator and rotating in operation, with at least one radiation-emitting device and at least one radiation detecting device mounted on the rotor.

2. Description of the Prior Art

A combined transmission/emission tomography apparatus is known from U.S. Pat. No. 6,870,814. In this patent, several variants of a combined transmission/emission tomography apparatuses are decribed, wherein a computed tomography apparatus has a tube with an opposite detector mounted on a rotary frame, while a PET detector can be moved into the examination region by a separately-installed C-arm. Another variant shows a mixed arrangement of nuclear-medical detectors and CT radiation sources with oppositely-arranged x-ray detectors. The system disclosed in this patent does not solve the problem that, due to the overall size in a real arrangement of radiation sources and detectors in a transmission/emission tomography apparatus, the gantry is too large due to the necessary space in the circumference of the rotor. Moreover, an arrangement of all detectors and radiation sources within a slice plane is not possible given a realistic diameter for the gantry.

SUMMARY OF THE INVENTION

An object of the present invention is to provide such a combined transmission/emission tomography apparatus that, given a relatively small design, allows the components essential for measurement (data acquisition) to be arranged within a slice plane.

The invention is based on the insight that it is possible to accommodate a number of radiation-emitting and radiation-detecting devices within a slice plane of a tomography apparatus when the radiation-emitting and radiation-detecting devices are not, as was previously typical, completely obstructed with the associated supply components in one unit on the rotor of the gantry, but instead the radiation-emitting and radiation-detecting components are separated from their supply components. Due to the small design of the separated components, it is possible to arrange all radiation-emitting and radiation-detecting components in one slice plane while the associated supply components are mounted laterally (in the system axis direction) on the rotor of the gantry.

With this design it is possible to provide a combined transmission/emission tomography apparatus wherein the gantry can be constructed with a significantly smaller diameter than is known in the prior art.

The components that perform only radiation-emitting and radiation-detecting functions (that are subsequently called primary components) thus are separated from the supply components required for the operation of these primary components. A spread of the arrangement in the z-axis direction is thus possible, such that now a relatively large number of radiation sources and detectors can be mounted on a small area.

Moreover, due to such a division it is now possible to modularly design an inventively-equipped tomography apparatus. A number of adapters uniformly mounted around the circumference of the rotor are advantageous, allowing the individual tomography components to be detachable or removeably mounted so that a highly variable and economical design of the combined transmission/emission tomography apparatus is possible.

Based on the above insights, a transmission/emission tomography apparatus in accordance with the invention for generation of tomographical slice images of an examination subject (preferably a patient), has a support structure composed of a stationary stator and a rotor borne In the stator that rotates in operation, and has at least one radiation-emitting device and at least one radiation -detecting device mounted on the rotor, the at least one radiation-emitting device and the at least one radiation-detecting device being primary components and having at least one associated supply component, wherein in the rotor all primary components are disposed in one rotation plane and all supply components are disposed outside of the rotation plane.

Via this inventive division of the radiation-emitting and radiation-detecting devices of a tomography apparatus into primary emitting and detecting (thus active) components on the one hand and secondary (thus passive) supply components an the other hand, a significantly more compact design requiring less area is now possible so that such combined apparatuses are economically realizable.

Several variants with radiation-emitting and radiation-detecting components are realized in the inventive combination tomography apparatuses. For example, the possibility exists to arrange a CT apparatus with two tube-detector combinations in connection with a SPECT detector on a rotor with small diameter. For example, a CT tube can also be arranged with CT detector in connection with a PET detector arrangement and additional laser arrangements for activation of medicines in the same slice plane in which the CT scan and the PET measurement occur.

Different combination examples are shown in the subsequent sub-claims, whereby the supply components are respectively mounted separate from the primary components.

For example, it is advantageous when an x-ray tube or laser optics is used as a radiation-emitting primary component while the respective supply component is a high voltage generator (if applicable with cooling) or a corresponding voltage supply and/or control electronics for the laser optics.

For example, a CT detector in single- or multi-line embodiment, a PET detector arrangement arranged opposite thereto or even a SPECT detector can be used as a radiation-detecting component. For example, the coincidence electronic of the PET detector or the supply electronic of a SPECT or CT detector can be viewed as supply components for the radiation-detecting primary components.

Furthermore, it in accordance with the invention not only a diagnostic radiation source but also a therapeutic radiation source can be mounted on the same rotor of the gantry, the radiation source itself being primary radiation-emitting component and the voltage supply and/or control electronic for the therapeutic radiation source being mounted as a secondary supply component outside of the slice plane.

The rotor can have a number of identical, mechanical connection adapters uniformly distributed over the area and furthermore can have the radiation-emitting and radiation-detecting primary components and their supply components removeably mounted, such that a modular assembly of the rotor is possible.

DESCRIPTION OF THE DRAWINGS

FIG. 3 shows a combined CT/SPECT apparatus with an inventive gantry arrangement.

FIG. 4 shows an inventive combined CT/PET apparatus with a therapeutic radiation source.

DESCRIPTION OF THE PREFERRED EMBODIMENTS

Figure 1:
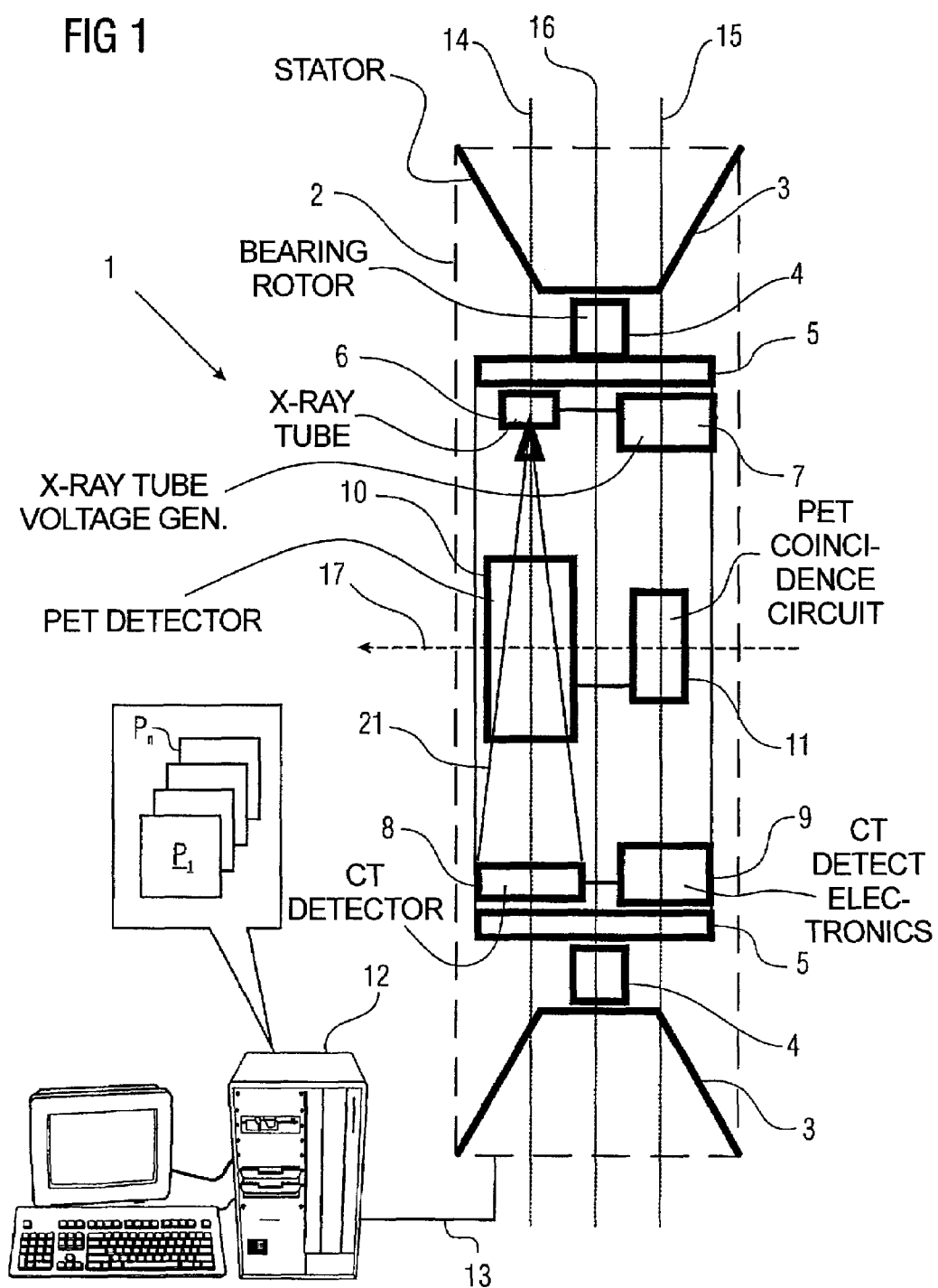
FIG. 1 is a longitudinal section in the z-axis direction through an embodiment of an inventive combined transmission/emission tomography apparatus.

A preferred embodiment of the inventive embodiment of a combined transmission/emission tomography apparatus is shown in FIG. 1. This tomography apparatus has a housing 2 in which a gantry with a stator 3 is located. A rotor 5 is borne opposite the stator 3 by a bearing 4 such that the rotor 5 can rotate. The primary radiation-emitting and radiation-detecting components am mounted on the rotor 5 in a first slice plane 14, while the secondary supply components are mounted on the rotor 5 in a slice plane 15, lateral to these primary components. Here an x-ray tube 6 that radiates a ray beam onto an opposite detector 8 is shown as a primary radiation-emitting component. The supply component 7 for the x-ray tube 6 is arranged laterally offset from the x-ray tube 6, which supply component 7 here as an example includes both the necessary high voltage supply and a cooling unit for the x-ray tubes. The supply electronics 9 for the CT detector is mounted in the laterally-arranged rotation plane 15, likewise laterally offset from the detector component 8. Due to this space-saving division, a PET detector arrangement with the primary PET detector component 10 can now be mounted in the same slice plane 14 in which the x-ray tube and the CT detector are also located, the associated coincidence circuit 11 being accommodated lateral thereto in the rotor 5 of the gantry.

The combined tomography apparatus is operated in a known manner by a control and evaluation computer 12 that outputs both the control units to the individual diagnosis units and receives the measurement data by the control and data connection. The control itself and the evaluation of the data ensue by the individual programs P1 through Pn that are integrated into the computer 12.

Figure 2:
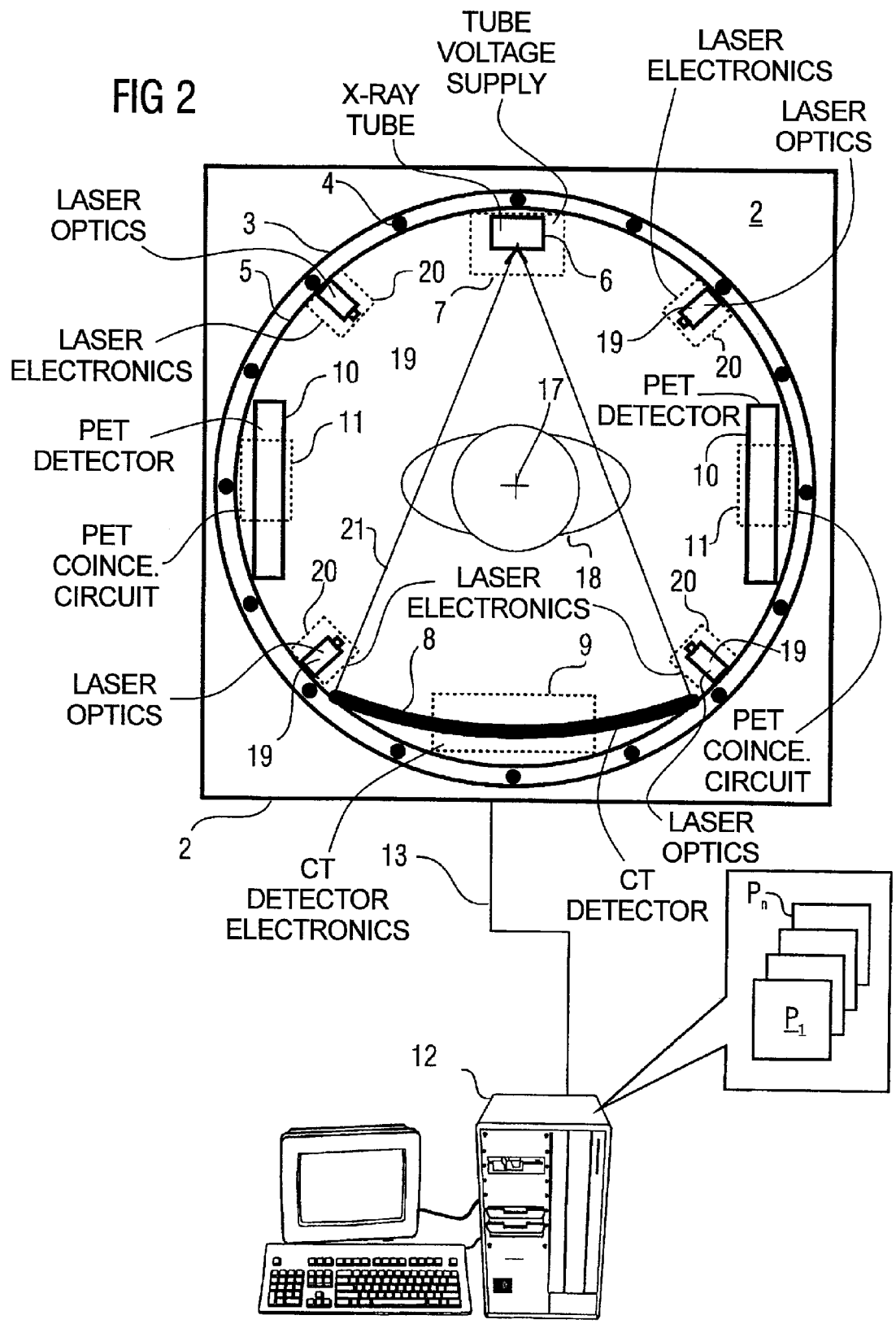
FIG. 2 is a cross-section through an inventive combined transmission/emission tomography apparatus with an x-ray tube, a PET detector and four laser devices.

Another variant of a combined transmission/emission tomography apparatus is shown in FIG. 2. FIG. 2 shows a cross-section perpendicular to the system axis 17 through an inventive arrangement, with the individual radiation-emitting and radiation-detecting primary components being shown in the primary slice plane and the secondary supply components lying behind them being shown dashed. Shown here on the rotor 5 of the gantry are a tube-detector combination for CT examination, composed of the x-ray-emitting primary component 6 with the detector primary component 8, whereby the supply units 7 and 9 are shown dashed. A PET detector unit, composed of a PET detector primary component 10 and the associated coincidence electronic 11, is offset by 90° relative to this CT unit. Four laser arrangements, each formed by laser optics 19 and associated supply electronic 20, are likewise arranged at 90° intervals in the primary slice plane.

FIG. 3 shows a third variant in which two x-ray sources 6 with the opposite primary detector elements 8 are arranged in the primary slice plane for CT scanning, while an additional SPECT detector 22 is inserted into the primary slice plane. As already indicated in the previous examples, the secondary supply components of the individual primary components are arranged offset in the z-direction on the rotor 5.

In contrast to the previously-shown, exclusively diagnostic combined tomography apparatuses, an additional therapeutic radiation source 24 is arranged on the rotor 5 of the gantry in the inventively-designed tomography apparatus in FIG. 4. Overall, the inventive tomography apparatus comprises a primary x-ray component 6 with opposite CT detector 8, a PET detector arrangement arranged offset from this with two primary PET detector components 10, and the already-mentioned primary component of a therapeutic radiation source 24, all of which are arranged in the same slice plane. The associated supply components are mounted on the rotor, here as wall offset from the primary radiation-emitting and radiation-detecting components.

For example, with such a combination it is possible to specifically mark a tumor center in a patient 18 by the administration of a tumor-specific, positron-emitting marker, and to determine the precise position of this tumor with the PET detectors. The surrounding healthy tissue can simultaneously be precisely determined by the CT arrangement with positing and absorption coefficients, so the therapeutic radiation source can be controlled immediately after the scan according to knowledge of the position of the tumor and of the surrounding tissue, such that the healthy tissue is spared as much as possible and only the tumor tissue is irradiated with the maximum dose.

Although such an arrangement is also possible in principle when the radiation-emitting and radiation-detecting components are not arranged in the same slice plane, in this arrangement a particularly optimal diagnostic and therapy is possible since no inaccuracies can arise with regard to the positioning of the patient and the alignment of the patient.

It will be understood that the features of the invention described above can be used not only in the specified combinations, but also in other combinations or independently within the context of the invention.

We claim as our invention:

1. A combined transmission/emission tomography apparatus for generation of tomographical slice images of a subject, comprising:
   a supporting structure comprising a stationary stator and a rotor mounted on a bearing in the stator for rotation during operation thereof, said bearing defining a bearing plane through said rotor;
   a plurality of primary components exclusively performing radiation emitting and radiation detecting functions and all mounted on said rotor at a first side of said bearing plane, comprising at least one radiation emitting device and at least one radiation detecting device;
   at least one supply component, associated with one of said primary components, mounted on said rotor at a second side of said bearing plane, opposite said first side; and
   all of said primary components being mounted on said rotor in a rotation plane and each supply component being mounted on said rotor outside of said rotation plane.

2. A tomography apparatus as claimed in claim 1 wherein said primary radiation components comprise at least one further radiation emitting device.

3. A tomography apparatus as claimed in claim 2 wherein said primary components comprise at least one further radiation detecting device.

4. A tomography apparatus as claimed in claim 1 wherein said at least one radiation emitting device is an x-ray tube.

5. A tomography apparatus as claimed in claim 4 wherein said at least one supply component is a voltage generation for said x-ray tube.

6. A tomography apparatus as claimed in claim 1 wherein said at least one radiation emitting device is laser optics.

7. A tomography apparatus as claimed in claim 6 wherein said at least one supply device is a component selected from the group consisting a voltage supply for said laser optics and control electronics for said laser optics.

8. A tomography apparatus as claimed in claim 1 wherein said radiation detecting device is a CT detector.

9. A tomography apparatus as claimed in claim 8 wherein said supply component comprises at least one component selected from the group consisting of a voltage supply for said CT detector and control electronics for said CT detector.

10. A tomography apparatus as claimed in claim 1 wherein said radiation detecting device is a PET detector.

11. A tomography apparatus as claimed in claim 10 wherein said supply device is a coincidence circuit for said PET detector.

12. A tomography apparatus as claimed in claim 1 wherein said radiation detecting device is a SPECT detector.

13. A tomography apparatus as claimed in claim 12 wherein said supply device is a component selected from the group consisting of a voltage supply for said SPECT detector and control electronics for said SPECT detector.

14. A tomography apparatus as claimed in claim 1 wherein said radiation emitting device is a radiation source for radiological therapy.

15. A tomography apparatus as claimed in claim 14 wherein said supply device comprises a component selected from the group consisting of a voltage supply for said radiation source and control electronics for said radiation source.

* * * * *